Aug. 22, 1939.     T. S. GAYLORD     2,170,019
METHOD OF WELDING
Filed Aug. 11, 1937

Thomas S. Gaylord,
INVENTOR:
BY Newton M. Perrins
George A. Gillette, Jr.
ATTORNEYS.

Patented Aug. 22, 1939

2,170,019

UNITED STATES PATENT OFFICE 2,170,019

METHOD OF WELDING

Thomas S. Gaylord, Rochester, N. Y.

Application August 11, 1937, Serial No. 158,541

9 Claims. (Cl. 219—10)

The present invention relates to a method for welding metal parts or sheets having a protective layer and more particularly to a method of joining such parts or sheets together with simultaneous replacement or reconditioning of the protective layer which may be destroyed or deteriorated adjacent the welded seam. The subject matter herein constitutes a continuation in part of my application Serial No. 62,318, filed February 4, 1936.

According to known welding practice, metal parts or sheets may be joined together by providing a metal seam along the juncture of said parts. Such a metal seam may be formed by arc welding. However, the heat required to melt the weld rod also destroys or partially destroys the protective layer, such as a galvanized layer upon the parts or sheets and especially along the margins of the welded seam.

The primary object of the present invention is the provision of a method for welding metal parts having a protective layer and at the same time reconditioning or refilling the regions adjacent the welded seam which have been more or less deteriorated during the welding operation.

Another object of the invention is the provision of a method as above described and in which the application of welding heat may be controlled so that the protective layer on the opposite surface of the metal sheets from the weld is not harmed.

A further object of the invention is the provision of a weld rod which comprises a fusible metal core, preferably a high copper alloy, which is coated with a corrosion-resistant metal.

A still further object of the invention is the provision of a welding method including the use of a weld rod coated with a corrosion-resistant metal coating which upon melting of the weld rod flows to the margins of the welded seam and into the regions vacated by the deteriorated protective layer on the metal parts or sheets.

A still further object of the invention is the provision of a weld rod having a fusible metallic core and provided with a coating including a corrosion-resistant metal selected from the group consisting of tin, chromium, nickel, zinc, cobalt, silver, antimony, cadmium, bismuth, or their alloys.

Other and further objects of the invention will be suggested to those skilled in the art by the description which follows.

Reference is hereby made to the accompanying drawing wherein.

Figure 1:
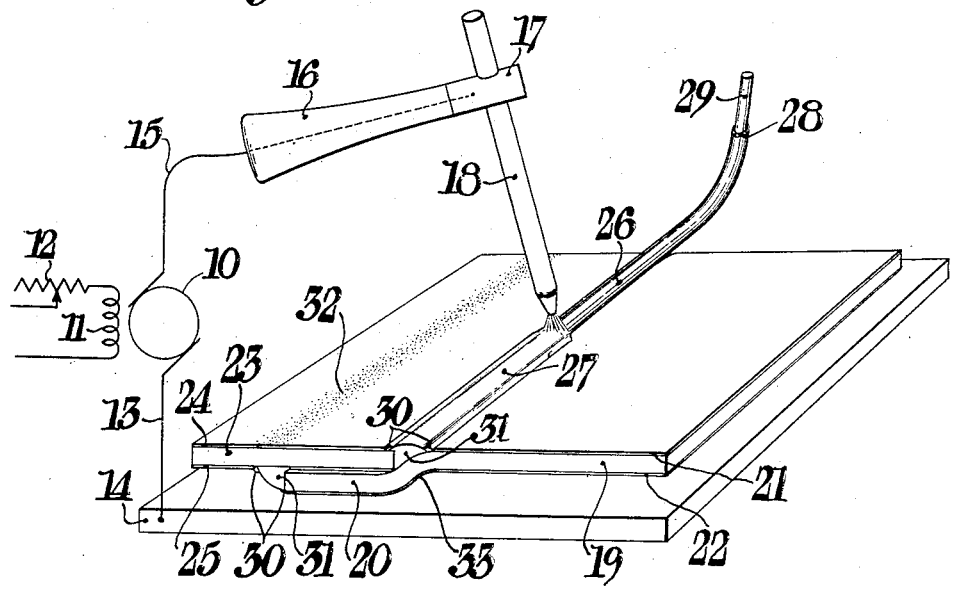
Fig. 1 is a perspective of apparatus for welding according to the invention.
Figure 2:
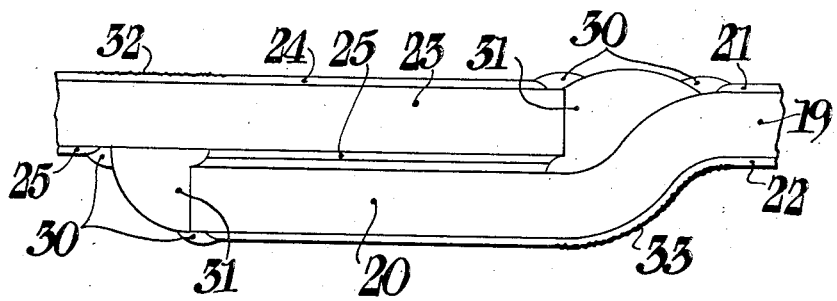
Fig. 2 is an end elevation to enlarged scale of a joint welded according to the invention.

As previously indicated the method of the invention is primarily directed to the reconditioning or replacement of a corrosion-resistant protective layer on metal parts or sheets which are being joined together by a welding process. Although the advantages of the invention may also be obtained in other known types of welding methods, the method and weld rod of the present invention will be described, by way of illustration only, in connection with an arc welding process.

According to one well recognized technique for arc welding, a direct current generator 10 is driven by a suitable prime mover and includes field winding 11 which is preferably separately excited from a source of electrical energy through a variable resistance 12. One side of generator 10 is connected by a conductor 13 to a metal plate 14 upon which the work or parts to be welded are supported. The other side of generator 10 is connected by a flexible conductor 15 to a holder including a handle 16 and jaws 17 between which a carbon rod 18 is clamped.

The parts to be joined are laid upon the metal plate 14 and a weld rod is placed between the ends to be welded together. An arc is drawn between the carbon rod 18 and the weld rod whereupon the metal of the weld rod and of the adjacent portions of the parts so that a welded seam is formed. Such a welding technique is suitable for all types of joints such as butt joints, lap joints, joggled lap joints, etc.

Although the welding method of the invention is suitable for all types of joints, it has only been illustrated as applied to a joggled lap joint with two full fillets because the applicability of the invention to all other types of joints is obvious.

The method and weld rod of the invention are particularly adapted to the joining of metal parts which are subject to corrosion and which for that reason are covered or coated with a corrosion resistant protective layer. The invention has been successfully employed for joining ferrous parts or sheets, such as iron or steel parts and iron or steel sheets, which have respectively been covered with a protective layer of zinc, nickel, chromium or copper. The outstanding use of the invention is for joining iron sheets with a galvanized or galvannealed zinc protective coating.

The metal sheet 19 has a joggled lap 20 and has protective layers 21 and 22 on opposite surfaces thereof. The metal sheet 23 fits into said joggled lap 20 and has protective layers 24 and 25 on its opposite surfaces. The weld rod 26 is placed along the juncture of the sheets 19 and 23 and upon drawing of the arc between rods 18 and 26 and movement of the arc along said juncture a welded seam 27 is formed.

With ordinary weld rods and under usual welding conditions, the protective layers adjacent and opposite the weld are destroyed or deteriorated. The stray portions of the arc or heat from the molten metal at the weld produces grooves in the protective layers adjacent each margin of the welded seam and along which grooves the protective layers are either totally or at least partially destroyed. Thus the base material of the parts or sheets is immediately atacked by any corrosive agents which may come in contact with the finished welded joint. Also the heat imparted by the arc to the welded seam is transmitted through sheets of ordinary thickness and under ordinary conditions is so intense as to melt the protective layer on the surface of the sheet opposite the welded seam so as to impair seriously the effectiveness of said protective layer. Obviously, the standard technique for welding parts covered by a protective layer is quite inadequate and some additional operation is necessary to restore the corrosion-resistant protective layer, especially along the margins of the welded seam.

The method of the present invention eliminates any such additional steps or subsequent operations for the purpose of restoring the corrosion-resistant properties of any portion of the protective layer adjacent or opposite the welded seam. According to the present method, the regions of destroyed or deteriorated protective layer are simultaneously or immediately filled during welding with a supply of corrosion resistant metal which is introduced into the welding arc as a coating upon the weld rod and which corrosion-resistant metal flows into said grooves or regions of destroyed or deteriorated protective layer.

Obviously, the parts or sheets to be provided are subject to corrosion, such as ferrous parts or sheets of iron or steel. Examples of protective layers for such parts or sheets are coverings or coatings of zinc, nickel, chromium or copper, all of which coatings, and particularly the zinc coatings, are deteriorated along the margins of the welded seam and simultaneously reconditioned during the welding operation by the corrosion resistant coating on the weld rod according to the invention.

Corrosion-resistant metals, such as tin, chromium, nickel, antimony, cobalt, silver, cadmium, zinc, or bismuth, perform in the manner just mentioned and may be readily coated onto the weld rod either by dipping the basic rod in a bath of the molten metal, by electrical or chemical deposition of the corrosion-resistant metal for the coating onto the rod, by rolling a thin sheet of the corrosion-resistant metal onto the basic core, or by any other method which will provide a coating of desired thickness on the rod.

The weld rod core is composed of a suitable fusible metal or alloy and may vary considerably in the character of the metals used and in the proportions of the metallic ingredients. Weld rods of copper alloy are preferred and particularly copper alloys with high copper content of the order of 60%–98% Cu. One type of weld rod that has proven very satisfactory is composed of an alloy containing 94.4% Cu, 4.5% Si and 1.1% Mn.

The diameter of the weld rod is determined by the type of the joint and/or the thickness of the sheets to be joined together. For the common types of joints and ordinary thicknesses of sheet metal, weld rods of $\frac{1}{16}''$ to $\frac{3}{16}''$ may be coated with the indicated corrosion-resistance metals or alloys to a thickness of 0.0005'' to 0.0015''. An arc welder of 75 amperes capacity will produce sufficient heat in the arc to produce satisfactory welded seams or joints under the above-mentioned conditions.

Close examination of the welding operation indicates that the coating 28 of the weld rod 26 is melted immediately and flows to the margins of the welded seam 27. Apparently the metal of the coating fills the grooves in the protective coating along the edges of the weld seam, which grooves otherwise would be regions of deteriorated protective coating.

The ridges 30 along each margin of the welded seam 27 are deemed to be principally composed of corrosion-resistant metal and may not be readily visible from the completed weld but are distinctly illustrated in the drawing in order to indicate clearly that the corrosion-resistant metal coating 28 of the weld rod 26 replaces those portions of the protective coatings 21 and 24 along the margins of the welded seam and which are deteriorated or volatilized during the welding operation. Said ridges 30, upon cooling, alloy with or adhere to the main body 31 of said seam 27 and these ridges 30, which are presumably for the most part of the corrosion-resistant metal, also form a good union with the protective layers, even though said protective layers are galvanized or composed of zinc which is readily volatilized or destroyed at the usual welding temperatures. The core 29 of the weld rod 26 forms the main body 31 of the joint or welded seam 27 and adheres to the basic metal of the sheets 19 and 23 to provide a joint of exceptional tensile strength. The melted corrosion-resistant coating 28 may occur at other portions of the seam, such as along the top thereof, but such occurrences of the coating are only incidental and do not reduce the exceptionally high tensile strength of the completed weld.

Furthermore, those portions of the protective layers opposite the welded seam are not deteriorated or damaged. Some of the heat at the weld passes through the sheets to said portions of the protective layers opposite the seam but such transmitted heat merely produces a slight disturbance in the projective layers, such as at 32 in protective layer 24 and at 33 in protective layer 22, but such disturbance is not sufficient to impair the properties of the protective layers. It may be necessary to regulate the heat of the arc by adjustment of variable resistance 12 but under proper conditions these disturbances in the protective layers opposite the welded seam can be reduced so as to have a negligible effect on the protective layers without detracting from the ease with which the welded seam can be formed.

The differences in the characteristics of the corrosion-resistant metals previously listed and which constitute satisfactory coatings for the weld rod according to the invention preclude the formation of any satisfactory theory to explain the action of the metal coating as it is melted from the weld rod or for the reduction in the heat transmitted to the opposite protective layer.

It may be that the coatings of metals of lower melting point than the weld rod core are directed to the margins of the seam by the unmelted portions of said core, or that the total heat of fusion of the thin metal coatings, even including those of higher melting point than the weld rod core, is less than the total heat of fusion of the relatively heavy core, or that by virtue of differences in surface tension the melted coating flows to the margins of the molten seam of melted core metal, or that a combination of these effects and/or other effects cause at last some of the melted coating to flow to the margins of the seam where it fills the grooves formed in the protective layer by the heat of the arc or weld and where said melted metal coating may alloy or amalgamate with the protective layer to form a good union therewith.

The reasons for the reduced disturbance in the protective layer opposite the weld seam are even more indefinite or obscure. The arc may be moved along the coated weld rod more rapidly than along a bare rod because there is less sputtering of the molten metal in the seam and this faster movement of the arc reduces the amount of heat applied to any portion of the weld so that there is less excess heat or less heat transmitted to the surfaces opposite the weld and as a result said surfaces are not appreciably disturbed. But whether this reduction in sputtering of the molten metal is because the melted coating has a quiescent effect upon the molten seam or whether said coating has some beneficial effect on the arc itself cannot be determined. But it is certain that the coating on the weld rod contributes to the lack of disturbance in the protective layers because serious disturbances occur in the protective layers opposite those welded seams formed under similar conditions and with uncoated weld rods.

It is apparent that the present invention is of broad application and embraces a wide range of equivalents such as corrosion-resistant coatings upon the weld rod which include alloys of the metals disclosed or other substances containing said metals or alloys and performing in the same manner as do the weld rod coatings specifically described.

Since the method and weld rod of the invention are susceptible of many variations, the present disclosure is to be construed in an illustrative sense and the scope of the invention is to be limited only by the appended claims.

Having now particularly described my invention, what I desire to secure by Letters Patent of the United States and what I claim is:

1. The method of joining metal parts having a protective layer, which comprises melting a metallic weld strip having a coating including a corrosion-resistant metal to form a seam at the juncture of said parts, the heat for melting said strip at least partially destroying the protective layer along the margins of said seam while the molten corrosion-resistant metal coating of said strip flows to the margins of said seam and into the regions of deteriorated protective layer.

2. The method of joining metal sheets having a protective layer on opposite surfaces thereof, which comprises melting a metallic weld strip having a covering essentially consisting of a corrosion-resistant metal to form a molten seam at the juncture of said sheets, the heat for melting said strip at least partially destroying the protective layer along the margins of said seam while the molten corrosion-resistant metal coating of said strip flows to said margins of the seam and into the regions of deteriorated protective layer, and controlling the application of heat for melting the coated metallic strip to prevent destruction of the protective layer on the surface opposite to the joint.

3. A method for joining ferrous parts having a protective layer of a corrosion-resistant metal which comprises melting a metallic weld strip having a coating including a corrosion-resistant metal to form a seam at the juncture of said parts, the heat for melting said weld strip at least partially destroying the protective layer along the margins of said seam while the molten corrosion-resistant metal coating of said weld strip flows to the margins of said seam and into the regions of deteriorated protective layer.

4. A method of joining metal parts having a protective layer of a corrosion-resistant metal, which comprises melting a copper alloy weld rod having a coating comprising a layer of a corrosion-resistant metal to form a seam at the juncture of said parts, the heat for melting said copper alloy weld rod at least partially destroying the protective layer along the margins of said seam while the molten corrosion-resistant metal coating of said copper alloy weld rod flows to the margins of said seam and into the regions of deteriorated protective layer.

5. A method of joining ferrous parts having a protective layer of zinc, which comprises applying to a metallic weld strip a coating essentially consisting of a corrosion-resistant metal and melting the coated weld strip to form a seam at the juncture of said parts, the heat for melting said weld strip at least partially destroying the zinc protective layer along the margins of said seam while the molten corrosion resistant metal coating of said weld strip flows to the margins of said seam and into the regions of deteriorated zinc protective layer.

6. A method of joining ferrous parts having a protective layer essentially comprising zinc, which comprises melting a metallic weld strip having a covering including a corrosion-resistant metal to form a seam at the juncture of said parts, the heat for melting said weld strip at least partially destroying the zinc protective layer along the margins of said seam while the molten corrosion resistant metal coating of said weld strip flows to the margins of said seam and into the regions of deteriorated zinc protective layer.

7. A method of joining ferrous parts having a zinc protective layer, which comprises melting a metallic weld rod having a coating essentially consisting of tin to form a seam at the juncture of said parts.

8. A method of joining ferrous parts having a zinc protective layer, which comprises melting a metallic weld rod having a coating essentially consisting of chromium to form a seam at the juncture of said parts.

9. A method of joining ferrous parts having a zinc protective layer, which comprises melting a metallic weld rod having a coating essentially consisting of nickel to form a seam at the juncture of said parts.

THOMAS S. GAYLORD.

CERTIFICATE OF CORRECTION.

Patent No. 2,170,019. August 22, 1939.

THOMAS S. GAYLORD.

It is hereby certified that error appears in the printed specification of the above numbered patent requiring correction as follows: Page 2, first column, line 41, for the word "provided" read joined; and second column, line 50, for "projective" read protective; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.